United States Patent [19]
Davis et al.

[11] Patent Number: 5,287,694
[45] Date of Patent: Feb. 22, 1994

[54] FLUID CHANNELING SYSTEM

[75] Inventors: Donald Y. Davis, Cincinnati; Bradley D. Hitch, Pleasant Plain, both of Ohio

[73] Assignee: General Electric Company, Cincinnati, Ohio

[21] Appl. No.: 956,324

[22] Filed: Oct. 5, 1992

[51] Int. Cl.$^5$ .......................... F02C 7/00; F04B 23/04
[52] U.S. Cl. ...................... 60/39.07; 417/77
[58] Field of Search ............... 60/39.07, 39.183, 269; 417/77, 80, 87, 173; 454/71, 76

[56] References Cited

U.S. PATENT DOCUMENTS

| | | | |
|---|---|---|---|
| 2,524,703 | 10/1950 | Hartman | 417/77 |
| 3,442,093 | 5/1969 | Rietdijk | 417/173 |
| 3,838,002 | 9/1974 | Gluntz et al. | 176/65 |
| 3,842,720 | 10/1974 | Herr | 454/71 |
| 4,091,613 | 5/1978 | Young | 60/39.07 |
| 4,374,469 | 2/1983 | Rannenberg | 62/402 |
| 4,493,195 | 1/1985 | Zalesak et al. | 62/402 |
| 4,503,683 | 3/1985 | Wieland et al. | 62/86 |
| 4,550,573 | 11/1985 | Rannenberg | 62/172 |
| 4,840,036 | 6/1989 | Spraker, Jr. | 62/172 |
| 4,875,345 | 10/1989 | Signoret | 62/402 |
| 5,036,678 | 8/1991 | Renninger et al. | 62/402 |
| 5,056,335 | 10/1991 | Renninger et al. | 62/402 |

FOREIGN PATENT DOCUMENTS

| | | | |
|---|---|---|---|
| 75041 | 7/1917 | Austria | 417/77 |
| 282694 | 4/1913 | Fed. Rep. of Germany | 417/77 |

OTHER PUBLICATIONS

Baumeister et al., "Standard Handbook for Mechanical Engineers," 1967, pp. iii, iv, 9-90 to 9-93.

*Primary Examiner*—Louis J. Casaregola
*Attorney, Agent, or Firm*—Jerome C. Squillaro

[57] ABSTRACT

A fluid channeling system includes a fluid ejector, a heat exchanger, and a fluid pump disposed in series flow communication The ejector includes a primary inlet for receiving a primary fluid, and a secondary inlet for receiving a secondary fluid which is mixed with the primary fluid and discharged therefrom as ejector discharge. Heat is removed from the ejector discharge in the heat exchanger, and the heat exchanger discharge is compressed in the fluid pump and channeled to the ejector secondary inlet as the secondary fluid In an exemplary embodiment, the temperature of the primary fluid is greater than the maximum operating temperature of a fluid motor powering the fluid pump using a portion of the ejector discharge, with the secondary fluid being mixed with the primary fluid so that the ejector discharge temperature is equal to about the maximum operating temperature of the fluid motor.

9 Claims, 2 Drawing Sheets

FLUID CHANNELING SYSTEM

The invention herein described was made in the performance of work under a NASA contract and is subject to the provisions of Section 305 of the National Aeronautics and Space Act of 1958, Public Law 85-568 (72 Stat. 435; 42 USC 2457).

The present invention relates generally to channeling systems for high temperature fluids, and, more specifically, to a high temperature fluid channeling system for a supersonic aircraft has turbine engine, or industrial fluid handling process.

BACKGROUND OF THE INVENTION

Gas turbine engines and industrial equipment utilize hot fluids, such a air, for various functions. Where the temperature of the fluid is greater than the maximum operating temperature capability of the materials disposed in contact therewith, the fluid temperature is considered excessive or too hot for practical use and a useful lifetime. Accordingly, either the excessive temperatures may not be used, or suitable means must be provided for cooling or protecting the materials from the excessive temperature, or both. For example, fluids are typically channeled through heat exchangers, fluid motors such as turbines, and fluid pumps such as compressors which are disposed in direct contact with the fluid and, therefore, the useful maximum temperature of the fluid cannot exceed the maximum operating temperature of these components without suitable protection thereof from excessive heat.

SUMMARY OF THE INVENTION

A fluid channeling system includes a fluid ejector, a heat exchanger, and a fluid pump disposed in series flow communication. The ejector includes a primary inlet for receiving a primary fluid, and a secondary inlet for receiving a secondary fluid which is mixed with the primary fluid and discharged therefrom as ejector discharge. Heat is removed from the ejector discharge in the heat exchanger, and the heat exchanger discharge is compressed in the fluid pump and channeled to the ejector secondary inlet as the secondary fluid. In an exemplary embodiment, the temperature of the primary fluid is greater than the maximum operating temperature of a fluid motor powering the fluid pump using a portion of the ejector discharge, with the secondary fluid being mixed with the primary fluid so that the ejector discharge temperature is equal to about the maximum operating temperature of the fluid motor.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
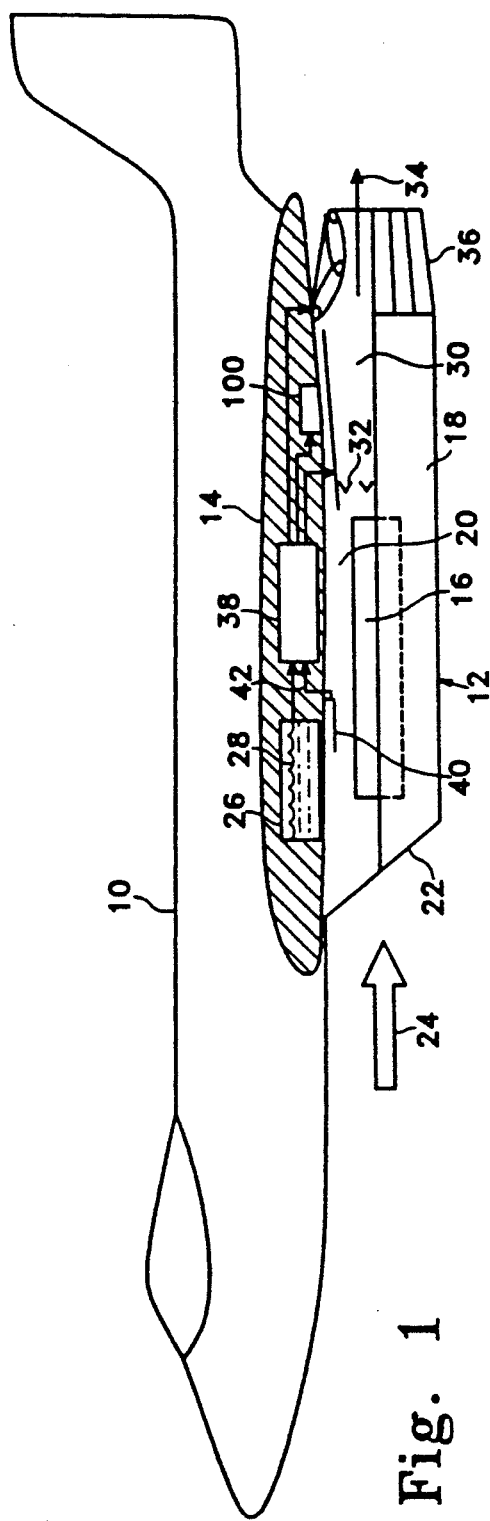
FIG. 1 is a schematic representation of a fluid channeling system in accordance with one embodiment of the present invention in combination with an aircraft gas turbine engine.

Illustrated schematically in FIG. 1 is an exemplary aircraft 10 configured for operation at supersonic speeds up to about Mach 5.5, for example. The aircraft 10 is powered by a plurality of conventional gas turbine engines 12, one of which is illustrated mounted below a wing 14 thereof. The engine 12 includes a conventional core engine 16 (having a fan, compressor, combustor, and turbine not shown) mounted in a nacelle 18 and spaced inwardly therefrom to define an annular bypass duct 20. The engine 12 further includes an inlet 22 for receiving ram air 24 generated during flight of the aircraft 10 at supersonic speeds up to about Mach 5.5.

The aircraft 10 further includes a fuel tank 26 containing fuel 28 disposed in the wing 14 for powering the engine 12. The fuel 28 is conventionally channeled to the core engine 16 wherein it is mixed with air for generating combustion gases which are discharged therefrom for generating thrust for powering the aircraft 10. The engine 12 further includes a conventional afterburner or ram burner 30 disposed downstream from the core engine 16 and in flow communication with the bypass duct 20. The ram burner 30 includes a plurality of fuel injectors 32 which receive fuel from the fuel tank 26 during ram operation of the engine 12 for generating combustion gases 34 which are discharged through a conventional air cooled, variable area exhaust nozzle 36.

A fluid handling system 38 in accordance with one embodiment of the present invention is provided for delivering cooling air to various portions of the engine 12. Although the invention is being described with respect to this exemplary high Mach speed aircraft gas turbine engine 12, it may also be used in other aircraft or industrial applications wherein excessively hot fluids are desired to be handled. In the aircraft application illustrated in FIG. 1, the ram air 24 which enters the engine inlet 22 under flight operation of the aircraft 10 at about Mach 5.5, has a temperature of about 1190° C. which is substantially higher than the maximum operating temperature of materials typically used in constructing the engine 12. For example, conventional nickel based or cobalt based superalloys used in aircraft gas turbine engines have a maximum operating temperature of about 980° C. In order to obtain useful lifetimes of these materials in the engine, a portion of the compressor air in the core engine 16 is typically bled for cooling any materials subject to excessive temperatures. However, bleeding compressor air for cooling purposes decreases the overall efficiency of the engine 12 and requires suitable cooling structures for channeling the cooling air thereto.

In the exemplary embodiment illustrated in FIG. 1, it is desirable to use a portion of the hot ram air 24 in the fluid handling system 38 and reducing its temperature for subsequent use in the engine 12. Accordingly, the system 38 is disposed in flow communication with the engine inlet 22 for receiving a portion of the hot ram air 24. For example, an annular inlet plenum 40 is disposed at the forward end of the bypass duct 20 for receiving a portion of the hot ram air 24 which is channeled through a suitable supply conduit 42 to the system 38. Since the inlet plenum 40 and supply conduit 42 are stationary structures, they may be readily insulated or formed of suitable high temperature materials for withstanding the temperature of the hot ram air 24 channeled therethrough.

Figure 2:
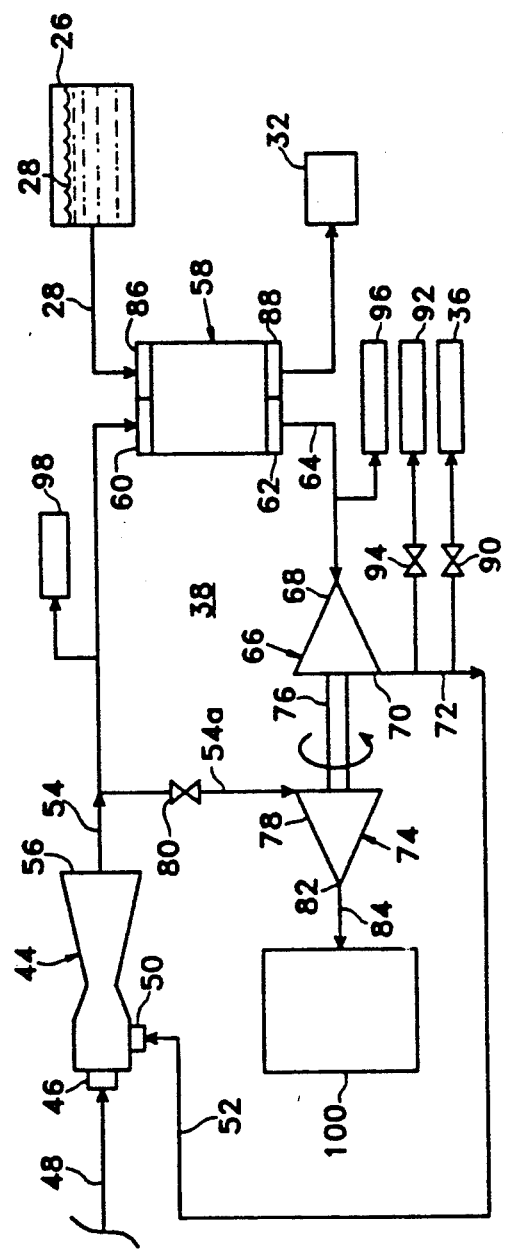
FIG. 2 is a schematic representation of the fluid channeling system illustrated in FIG. 1.

FIG. 2 illustrates schematically the fluid channeling system 38 in accordance with one embodiment of the present invention and includes a fluid or air ejector 44 having a first or primary inlet 46 disposed in flow communication with the supply conduit 42 of FIG. 1 for receiving a portion of the ram air 24 as a hot primary fluid or air 48 at a primary temperature $T_P$ which may be up to about 1190° C. when the aircraft 10 operates at about Mach 5.5. The ejector 44 includes a secondary inlet 50 for receiving a secondary fluid or air 52 at a secondary temperature $T_s$ which is less than the primary temperature $T_p$. The ejector 44 functions in a conventional manner using the secondary fluid 52 as a motive flow and the primary fluid 48 as the suction flow being driven through the ejector 44 by the secondary fluid 52 which mixes together the primary fluid 48 with the secondary fluid 52 which are then discharged together as a mixed fluid, ejector discharge 54 from an outlet 56 of the ejector 44 Since the lower temperature secondary fluid 52 is mixed with the higher temperature primary fluid 48, the resulting temperature of the ejector discharge 54 is at a temperature $T_{ed}$ below the primary temperature $T_p$ and greater than the secondary temperature $T_s$.

A conventional heat exchanger 58 includes a first inlet 60 disposed in flow communication with the ejector outlet 56 through a suitable conduit for receiving the ejector discharge 54. The heat exchanger 58 also includes a first outlet 62 for discharging the ejector discharge 54 which is conventionally cooled in the heat exchanger 58 as heat exchanger discharge 64 at a temperature $T_{xd}$ which is less than the ejector discharge temperature $T_{ed}$.

A conventional fluid pump in the form of an exemplary air compressor 66, such as axial or centrifugal air compressors, includes an inlet 68 disposed in flow communication with the heat exchanger first outlet 62 through a suitable conduit for receiving the heat exchanger discharge 64 therefrom. The compressor 66 also includes an outlet 70 disposed in flow communication with the ejector secondary inlet 50 through a suitable conduit for channeling thereto the heat exchanger discharge 64 compressed in the compressor 66 as pump or compressor discharge 72 at a temperature $T_c$ for use in the ejector 44 as the ejector secondary fluid 52.

Air ejectors such as the ejector 44 are conventional and require that the secondary fluid 52 has a pressure suitably greater than the pressure of the primary fluid 48 for effective operation. The secondary fluid temperature $T_s$ is less than the primary fluid temperature $T_p$ for reducing the temperature of the primary fluid 48 as it is mixed therewith to generate the cooler ejector discharge 54. However, energy is required to suitably compress the secondary fluid 52 in the compressor 66 which reduces overall efficiency of the system 38. This efficiency loss can be minimized by configuring the thermodynamic cycle of the system: 38 to ensure that the ejector discharge temperature $T_{ed}$ is reduced to not substantially less than the maximum operating temperature of the materials found immediately downstream from the ejector 44 in the exemplary configuration wherein the primary fluid temperature $T_p$ is initially greater than the maximum operating temperature of such materials as described in further detail below.

In order to drive the compressor 66, a fluid motor in the exemplary form of a conventional air turbine 74, such as axial or radial inflow air turbines, is operatively joined to the compressor 66 by a drive shaft 76. The turbine 74 includes an inlet 78 disposed in flow communication with the ejector outlet 56 by a suitable conduit disposed in parallel with the heat exchanger 58 for receiving a portion 54a of the ejector discharge 54 for powering the turbine 74 to rotate and drive the compressor 66. The remaining portion of the ejector discharge 54 flows to the heat exchanger 58. A suitable valve 80 selectively controls flow to the turbine 74. The turbine 74 also includes an outlet 82 for discharging the ejector discharge portion 54a as motor discharge 84 at a temperature $T_{md}$ which is substantially less than the ejector discharge temperature $T_{ed}$ since energy is extracted therefrom by the turbine 74.

Since both the heat exchanger 58 and the turbine 74 are disposed in direct flow communication with the ejector discharge 54, the ejector discharge temperature $T_{ed}$ must be suitably low to prevent excessive heating of the heat exchanger 58 and the turbine 74 which would decrease their effective useful lives. For example, the turbine 74 may be formed of conventional nickel based or cobalt based superalloys having a maximum operating temperature of about 980° C. for obtaining a useful life thereof. Since the primary fluid temperature $T_p$ is about 1190° C. in this exemplary embodiment, the excessive temperature thereof must be suitably reduced to prevent overheating of the heat exchanger 58 and the turbine 74.

Accordingly, the ejector 44, the heat exchanger 58, and the compressor 66 are preferably sized to operate in a thermodynamic cycle for providing the compressor discharge 72 to the ejector 44 for mixing with the primary fluid 48 so that the ejector discharge temperature $T_{ed}$ is preferably equal to about the maximum operating temperature of the turbine 74, for example, as well as that of the heat exchanger 58. The flow rate, pressure, and temperature of the compressor discharge 72 may be conventionally selected relative to the corresponding flow rate, pressure, and temperature of the primary fluid 48 so that the ejector discharge temperature $T_{ed}$ is no greater than about the maximum operating temperature, and is preferably substantially equal thereto. In this way, the energy required from the compressor 66 to power the ejector 44 may be minimized to that needed solely to reduce the excessive temperature of the primary fluid 48 down to the maximum operating temperature of the turbine 74, for example. The turbine 74 may, therefore, be a relatively simple turbine which does not require additional cooling arrangements thereof for maintaining acceptable levels of temperature thereof below the maximum operating temperature.

The ejector 44 merely reduces the temperature of the primary fluid 48 by mixing it with the lower temperature secondary fluid 52 to generate the ejector discharge 54. The heat exchanger 58, in contrast, removes heat from the system 38, and in the exemplary embodiment illustrated uses the fuel 28 in the fuel tank 26 for this purpose. More specifically, the heat exchanger 58 further includes a second inlet 86 disposed in flow communication with the fuel tank 26 by a suitable conduit connected mediately or directly thereto for receiving a portion of the fuel 28. The heat exchanger 58 also includes a second outlet 88 disposed in flow communication with the fuel injectors 32 by suitable conduits, and the heat exchanger 58 is configured for channeling the fuel 28 from the second inlet 86 to the second outlet 88 for removing heat from the ejector discharge 54 channeled from the first inlet 60 to the first outlet 62 of the heat exchanger 58. The first inlet and outlet 60, 62 and conduit therebetween define the hot side of the heat exchanger 58 for carrying the hot ejector discharge 54 for undergoing heat removal therein, and the second inlet and outlet 86, 88 and conduit therebetween define the cold side of the heat exchanger 58 through which the fuel 28 is channeled for absorbing heat from the ejector discharge 54 carried through the hot side in a conventional manner.

The resulting system 38 including the ejector 44, heat exchanger 58, compressor 66, and turbine 74 provide a thermodynamic cycle wherein the temperature of the primary fluid 48 is initially reduced by the ejector 44, with heat being removed from the ejector discharge 54 channeled through the heat exchanger 58. The compressor 66 is powered by the turbine 74 using the ejector discharge 54 as the power source for compressing the heat exchanger discharge 64 for powering the ejector 44. In the cycle defined by the system 38, various flow rates, pressures, and temperatures are provided at each of the components thereof in accordance with conventional laws of mechanics and thermodynamics for the components. The ejector discharge temperature $T_{ed}$ is less than the primary fluid temperature $T_p$ but greater than the temperature of the secondary fluid $T_x$. The temperature $T_{xd}$ of the heat exchanger discharge 64 is substantially lower than the ejector discharge temperature $T_{ed}$ since heat is being removed by the heat exchanger 58 at relatively high efficiency with a relatively small reduction in pressure thereof. The compressor 66 suitably compresses the heat exchanger discharge 64 at a pressure ratio of about 1.2, for example, while simultaneously increasing the temperature $T_c$ of the compressor discharge 72 which is substantially lower than the primary fluid temperature $T_p$. The lowest temperature of the system 38 in this exemplary embodiment may be obtained from the turbine discharge 84 since energy is being extracted from the ejector discharge portion 54a being provided thereto with a substantial decrease in both pressure and temperature thereof.

Accordingly, the system 38 includes various locations from which a portion of the cycle fluids may be removed for use outside the basic cycle or system 38 as an energy source for powering additional devices, or as heat sinks useful for cooling additional devices.

For example, the system 38 may further include one or more secondary devices disposed in flow communication with at least one of the ejector 44, heat exchanger 58, compressor 66, and turbine 74 for receiving therefrom a portion of the ejector discharge 54, heat exchanger discharge 64, compressor discharge 72, and turbine discharge 84, respectively. An exemplary one of such secondary devices may include the exhaust nozzle 36 of the gas turbine engine 12 illustrated in FIG. 1 which is joined in flow communication with the compressor outlet 70 for receiving a portion of the compressor discharge 72 in parallel with the ejector 44 for conventionally cooling the exhaust nozzle 36. A suitable valve 90 may be disposed in the conduit joining the exhaust nozzle 36 to the compressor outlet 70 for regulating the portion of the compressor discharge 72 channeled to the exhaust nozzle 36 for the cooling thereof.

During ram operation of the engine 12, it is preferable to shut down the engine 12 and allow the ram air 24 to flow directly through the bypass duct 20 into the ram burner 30 for being mixed with the fuel from the injectors 32 to generate the combustion gases 34 for providing thrust for supersonic operation. In order to cool the shutdown core engine 16, FIG. 2 illustrates schematically a conventional purge device 92 which includes suitable flow paths for channeling another portion of the compressor discharge 72 through the engine 16 to provide cooling purge air therethrough. Another valve 94 may be disposed between the purge device 92 and the compressor outlet 70 for regulating the portion of the compressor discharge 72 channeled thereto.

As shown in FIG. 2, another one of the secondary devices designated 96 may be any conventional device requiring cooling or a power source which may use a portion of the heat exchanger discharge 64 suitable provided thereto.

Yet another secondary device designated 98 may be any conventional device operatively joined to the ejector outlet 56 for receiving a portion of the ejector discharge 54 for either cooling or providing an energy source.

Since the lowest temperature fluid in the system 38 illustrated in FIG. 2 is the turbine discharge 84, the turbine outlet 82 is preferably joined in flow communication with a conventional electrical controller 100 of the engine 12 illustrated in FIG. 1 for channeling thereto at least a portion if not all of the turbine discharge 84 for conventionally cooling the electrical controller 100.

In all of the above examples, portions of the various fluids being channeled through the system 38 may be extracted therefrom for providing additional power for the secondary devices or for the cooling thereof without substantially degrading the performance of the system 38 to effectively reduce the temperature of the primary fluid 48 to a more usable temperature no greater than the maximum operating temperature of the materials being used. Of course, the power source of the entire system 38 is the ram air 24 channeled to the ejector 44 as the primary fluid 48 which is in turn channeled through the turbine 74 for powering the compressor 66. Accordingly, the several components 44, 58, 66, and 74 are selectively sized for each particular application to at least appreciably reduce the temperature of the primary fluid 48 being discharged from the ejector 44 as well as providing any desired extracted fluid flow from the various components of the system 38 as described above.

Although the system 38 may be operated with the primary fluid 48 below the maximum operating temperature of the materials used downstream from the ejector 44, in the preferred embodiment the temperature thereof is above such maximum operating temperature. Accordingly, the ejector 44 must be suitably configured for withstanding the excessive temperature $T_p$ of the primary fluid 48, and for example, may be formed from conventional uncooled, high temperature ceramic composite materials capable of withstanding the elevated temperature of the primary fluid 48 until the temperature within the ejector 44 is reduced at its outlet 56. It is more economical and practical to suitably construct the stationary inlet plenum 40, the ejector 44, and the supply conduit 42 extending therebetween for accommodating the elevated temperature of the primary fluid 48 than to construct the stationary and rotary structures immediately downstream therefrom for such elevated high temperature.

Figure 3:
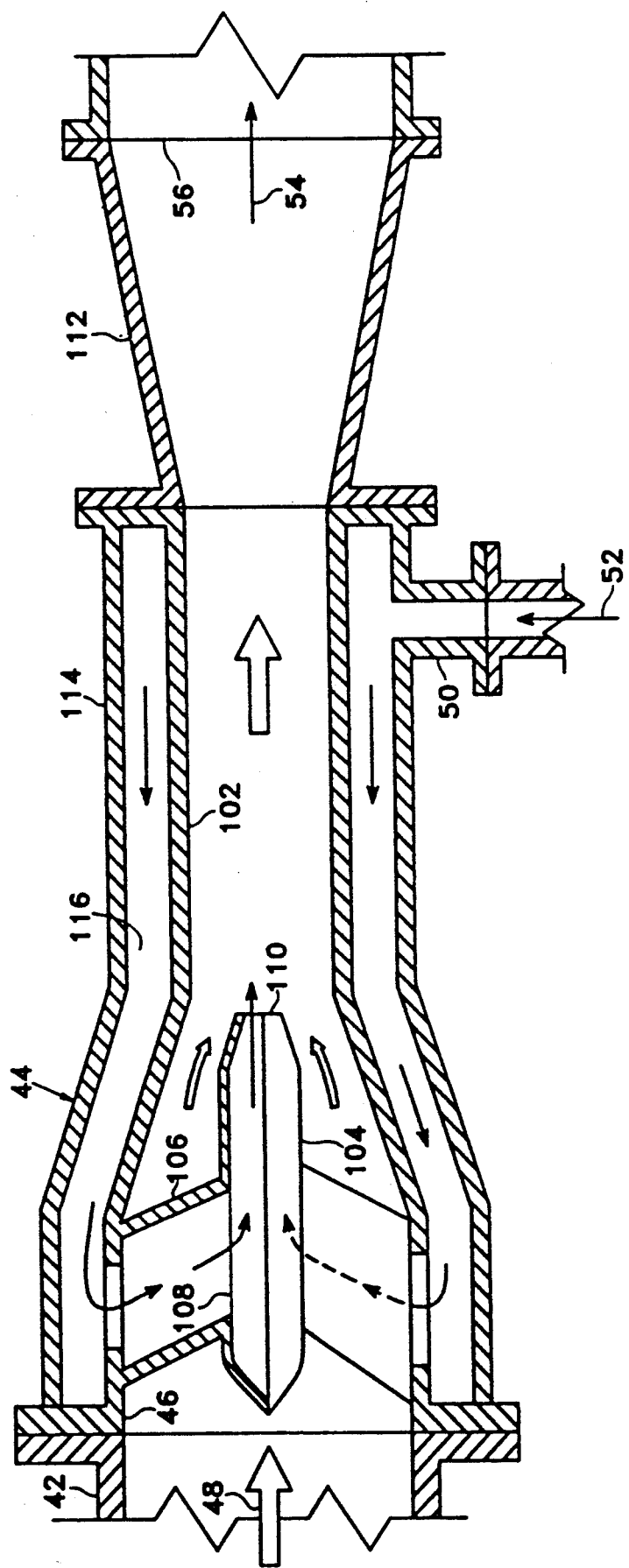
FIG. 3 is an axial, partly sectional view of an exemplary fluid ejector used in the fluid channeling system illustrated in FIG. 2.

FIG. 3 illustrates an exemplary embodiment of the ejector 44 in accordance with one embodiment of the present invention which may be made of conventional superalloy metals instead of ceramic, with a cooling arrangement for maintaining acceptable temperatures of the materials thereof. More specifically, the ejector 44 further includes a mixing chamber 102 disposed in flow communication with the primary inlet 46 which is in turn disposed in flow communication with the supply conduit 42. A coaxial nozzle 104 is disposed at the upstream end of the mixing chamber 102 and is supported therein by a plurality of circumferentially spaced apart hollow struts 106. The nozzle 104 has side inlets 108 disposed in flow communication with the ejector secondary inlet 50 through the several struts 106, and an outlet 110 disposed in flow communication with the mixing chamber 102. A conventional diffuser 112 is disposed in flow communication with the mixing chamber 102 for receiving therefrom and for diffusing the primary and secondary fluids 48, 52 mixed therein for discharge from the ejector outlet 56 as the ejector discharge 54.

The ejector 44 further includes an annular casing 114 surrounding the mixing chamber 102 and the struts 106 and nozzle 104 to define an annular plenum 116. The plenum 106 is disposed in flow communication with the ejector secondary inlet 50 and the nozzle 104 for channeling the secondary fluid 52 therebetween for cooling the ejector 44 As shown in FIG. 3, the secondary inlet 50 is disposed at the aft end of the mixing chamber 102 so that the secondary fluid 52 is firstly channeled upstream along the outer surface of the mixing chamber 102 and then radially inwardly through the several struts 106 and in turn downstream through the nozzle 104 for discharge into the mixing chamber 102 for mixing with the primary fluid 48 channeled downstream over the outer surface of the nozzle 104 and circumferentially between the adjacent struts 106. In this way, the relatively cool compressor discharge 72 which is used for the secondary fluid 52 is channeled through the ejector 44 in the regions thereof wherein the hot primary fluid 48 is carried. The secondary fluid 52, therefore, cools the ejector 44 against the heat of the primary fluid 48 to maintain the material thereof below the maximum operating temperature, with the secondary fluid 52 then being ejected from the nozzle outlet 110 for mixing with the primary fluid 48 and reducing its temperature upon discharge from the ejector outlet 56.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A fluid channeling system comprising:
   means or supplying a primary fluid at a primary temperature;
   a fluid ejector having a primary, suction inlet for receiving said primary fluid, a secondary inlet for receiving a secondary fluid at a secondary temperature less than said primary temperature, and an outlet for discharging together said primary and secondary fluids as a mixed fluid ejector discharge at a temperature below said primary temperature;
   a heat exchanger having a first inlet disposed in flow communication with said ejector outlet for receiving said ejector discharge therefrom, a first outlet for discharging said ejector discharge cooled in said heat exchanger as heat exchanger discharge at a temperature below said ejector discharge temperature, and means for cooling said ejector discharge channeled between said first inlet and said first outlet;
   a fluid pump having an inlet disposed in flow communication with said heat exchanger first outlet for receiving said heat exchanger discharge, and an outlet disposed in flow communication with said ejector secondary inlet or channeling thereto said heat exchanger discharge compressed in said fluid pump as pump discharge or use in said ejector as said ejector secondary fluid; and
   a fluid motor operatively joined to said fluid pump by a drive shaft, and including an inlet disposed in flow communication with said ejector outlet in parallel with said heat exchanger for receiving a portion of said ejector discharge for powering said fluid motor to drive said fluid pump, and an outlet for discharging said ejector discharge portion as motor discharge at a temperature less than said ejector discharge temperature.

2. A system according to claim 1 wherein:
   said fluid motor is formed of a material having a maximum operating temperature;
   said primary fluid temperature is greater than said maximum operating temperature; and
   said ejector, said heat exchanger, and said fluid pump are sized to operate in a thermodynamic cycle for providing said compressor discharge to said ejector for mixing with said primary fluid so that said ejector discharge temperature is equal to about said maximum operating temperature.

3. A system according to claim 1 in combination with a gas turbine engine for powering an aircraft at supersonic speed, said engine including an inlet for receiving ram air, and wherein:
   said ejector primary inlet is disposed in flow communication with said engine inlet for receiving a portion of said ram air as said primary fluid;
   said fluid pump is in the form of an air compressor; and
   said fluid motor is in the form of an air turbine.

4. A system according to claim 3 further including means disposed in flow communication with at least one of said ejector, said heat exchanger, said compressor, and said turbine for receiving therefrom a portion of said ejector discharge, said heat exchanger discharge, said compressor discharge, and said turbine discharge, respectively.

5. A system according to claim 4 wherein said receiving means is an exhaust nozzle of said gas turbine engine and is joined in flow communication with said compressor outlet for receiving a portion of said compressor discharge for cooling said exhaust nozzle.

6. A system according to claim 4 wherein said receiving means is an electrical controller of said gas turbine engine and is joined in flow communication with said turbine outlet for receiving a portion of said turbine discharge for cooling said electrical controller.

7. A system according to claim 4 wherein:
   said aircraft includes a fuel tank containing fuel;
   said engine includes a ram burner having a plurality of fuel injectors; and
   said heat exchanger cooling means includes a second inlet disposed in flow communication with said fuel tank for receiving a portion of said fuel, and a second outlet disposed in flow communication with said fuel injectors, and said heat exchanger being configured for channeling said fuel from said second inlet to said second outlet for removing heat from said ejector discharge channeled from said first inlet to said second inlet of said heat exchanger.

8. A system according to claim 4 wherein said ejector further comprises:
 a mixing chamber disposed in flow communication with said primary inlet;
 a nozzle having an inlet disposed in flow communication with said secondary inlet, and an outlet disposed in flow communication with said mixing chamber; and
 a diffuser disposed in flow communication with said mixing chamber for diffusing said primary and secondary fluids mixed therein for discharge from said ejector outlet.

9. A system according to claim 8 wherein said ejector further comprises an annular casing surrounding said mixing chamber and said nozzle to define an annular plenum, said plenum being disposed in flow communication with said secondary inlet and said nozzle for channeling said secondary fluid therebetween for cooling said ejector

* * * * *